June 12, 1928.
S. E. KURTZ
1,672,893
ICE SAW
Filed July 7, 1925
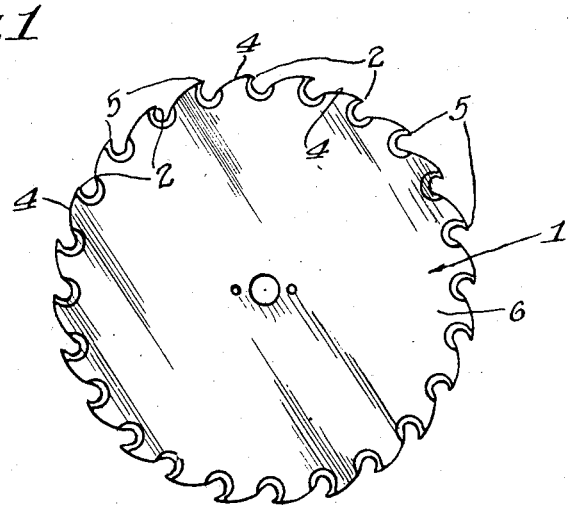
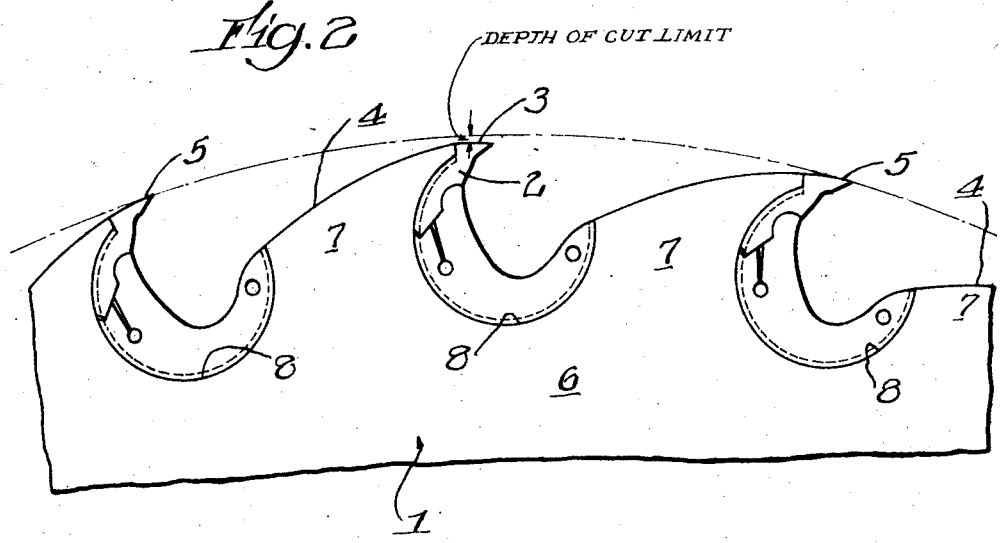
Inventor
Samuel E. Kurtz
By Parker & Carter attys Patented June 12, 1928.

1,672,893

UNITED STATES PATENT OFFICE.

SAMUEL E. KURTZ, OF SAC CITY, IOWA.

ICE SAW.

Application filed July 7, 1925. Serial No. 42,004.

This invention relates to ice saws and has for its object to provide a new and improved saw for cutting ice. The invention has as a further object to provide a saw which is arranged so that the saw cannot be fed too rapidly to the material, thus preventing too great a load upon the engine which might cause the engine to slow down or stop, and this is particularly true where an internal combustion engine is used. The invention has as a further object to provide a saw which will be more efficient in discharging the material cut by the teeth of the saw. The invention has other objects which are more particularly pointed out in the accompanying description.

Referring now to the drawing:

Fig. 1 is a view showing a saw embodying the invention.

Fig. 2 is an enlarged view showing the construction of the teeth of the saw.

Like numerals refer to like parts throughout the several figures.

In carrying out my invention I provide a saw 1 having a series of teeth. Certain of these teeth preferably the alternate teeth are arranged so that they are not cutting teeth but limiting teeth to limit the depth of the cut of the cutting teeth, thereby preventing the cutting teeth from being fed too rapidly to the material; that is, preventing the cutting teeth from making too heavy a cut and thereby putting too great a load upon the engine.

In the construction shown the limiting teeth 2 have their peripheral faces at the point 3 cut away, rounded or blunted so that the non-cutting portion back of the point engages the material being cut and prevents the points 3 from acting as cutting teeth. The peripheral portions 4 of the saw body are inclined inwardly from the non-cutting teeth 3, as shown in Figure 2. This limits the depth to which the cutting teeth 5 project into the material. The saw teeth may be made in any desired manner and for purpose of illustration I have shown a saw having the body portion 6 and provided with removable teeth which can be removed either for sharpening or replacement.

The saw is provided with a series of projections 7 and a series of indentations 8, and the removable teeth are located in these indentations and are removably held in place in any desired manner.

By this arrangement of the cutting teeth and the limiting teeth I find that the particles cut by the cutting teeth are discharged in a much more efficient manner and are not ground up into fine particles as would be the case if all the teeth were cutting teeth.

The teeth 3 do not do any cutting work normally. This gives us two throats to remove the sawdust for each cutting tooth, which doubles the capacity for removing sawdust. This sawdust is too fine for a single saw tooth throat to remove without producing excessive resistance of the saw in the ice, thereby wasting power and reducing the sawing capacity of the motor. The means of limiting the depth of the cut by the teeth 3 also prevents overloading of the motor.

I claim:

1. A circular saw comprising a plurality of removable cutting teeth and a plurality of non-cutting limiting teeth, said limiting teeth interspersed between the cutting teeth.

2. A circular saw comprising a plurality of removable cutting teeth, and a plurality of removable, non-cutting limiting teeth, the cutting teeth and the limiting teeth alternating.

Signed at Sac City, county of Sac and State of Iowa, this 16th day of June 1925.

SAMUEL E. KURTZ.